United States Patent [19]
Jacobsen

[11] 3,864,983
[45] Feb. 11, 1975

[54] ROTARY-TO-LINEAR AND LINEAR-TO-ROTARY MOTION CONVERTERS

[76] Inventor: Stephen C. Jacobsen, 12 Burton St., Arlington, Mass. 02174

[22] Filed: May 8, 1974

[21] Appl. No.: 468,215

Related U.S. Application Data
[63] Continuation of Ser. No. 289,482, Sept. 15, 1972, abandoned.

[52] U.S. Cl............................................ 74/89, 3/1.1
[51] Int. Cl............................................ F16h 27/02
[58] Field of Search ........... 74/89; 3/1.1, 12.2, 12.3, 3/12.6

[56] References Cited
UNITED STATES PATENTS

| | | | |
|---|---|---|---|
| 2,428,632 | 10/1947 | Mollenhour | 3/12.2 |
| 2,445,711 | 7/1948 | Fitch | 3/12.1 |
| 3,266,059 | 8/1966 | Stelle | 3/12.3 |
| 3,421,379 | 1/1969 | Carroll | 74/89 |
| 3,534,908 | 10/1970 | Coleman et al. | 74/89 |
| 3,631,592 | 1/1972 | Potter | 3/1.1 |
| 3,683,423 | 8/1972 | Crapanzane | 3/1.1 |

*Primary Examiner*—Wesley S. Ratliff, Jr.

[57] ABSTRACT

Cell elements of rotary-to-linear and linear-to-rotary motion converters, series of such cells and combinations of such series are disclosed together with operated and operating mechanisms. Each cell element consists of a pair of rotatable separators which may be common to adjacent cells and are interconnected by linking members arranged so that when one separator is turned relative to another the cell is subject to a contracting motion with the locations of the connections between the links and each separator travelling along a combined rotary and transitional path. With a contracted cell, an axial pull on one separator exerts a combined axial pull and torque on its other separator. The link lengths are less than the square root of the product of the diameters of said paths unless stability over the maximum rotation is not important. Prosthetic devices are disclosed incorporating the converters.

17 Claims, 12 Drawing Figures

PATENTED FEB 11 1975    3,864,983

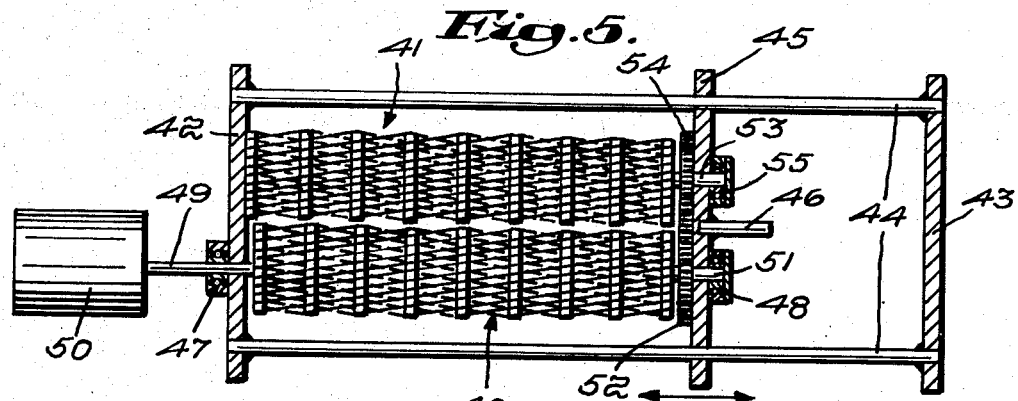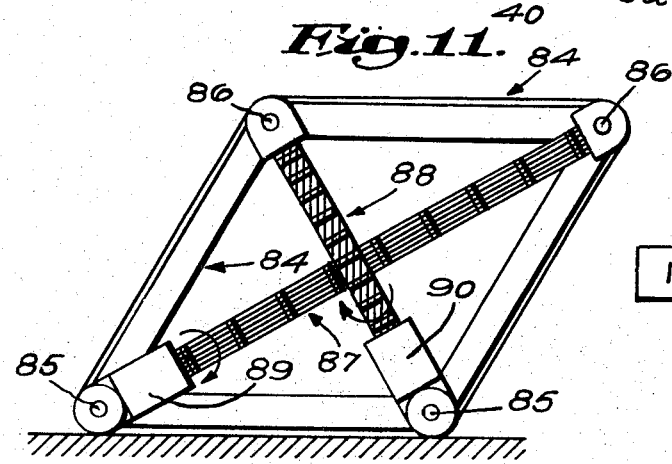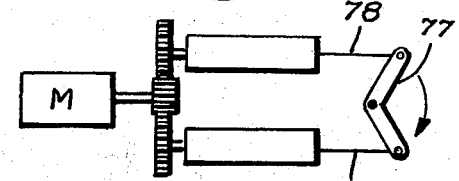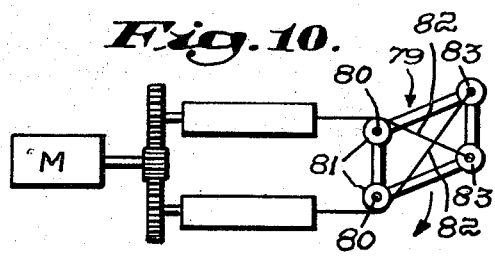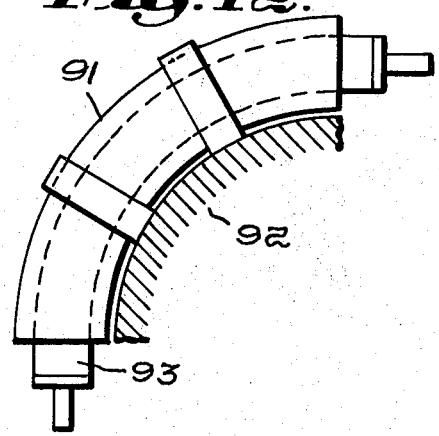

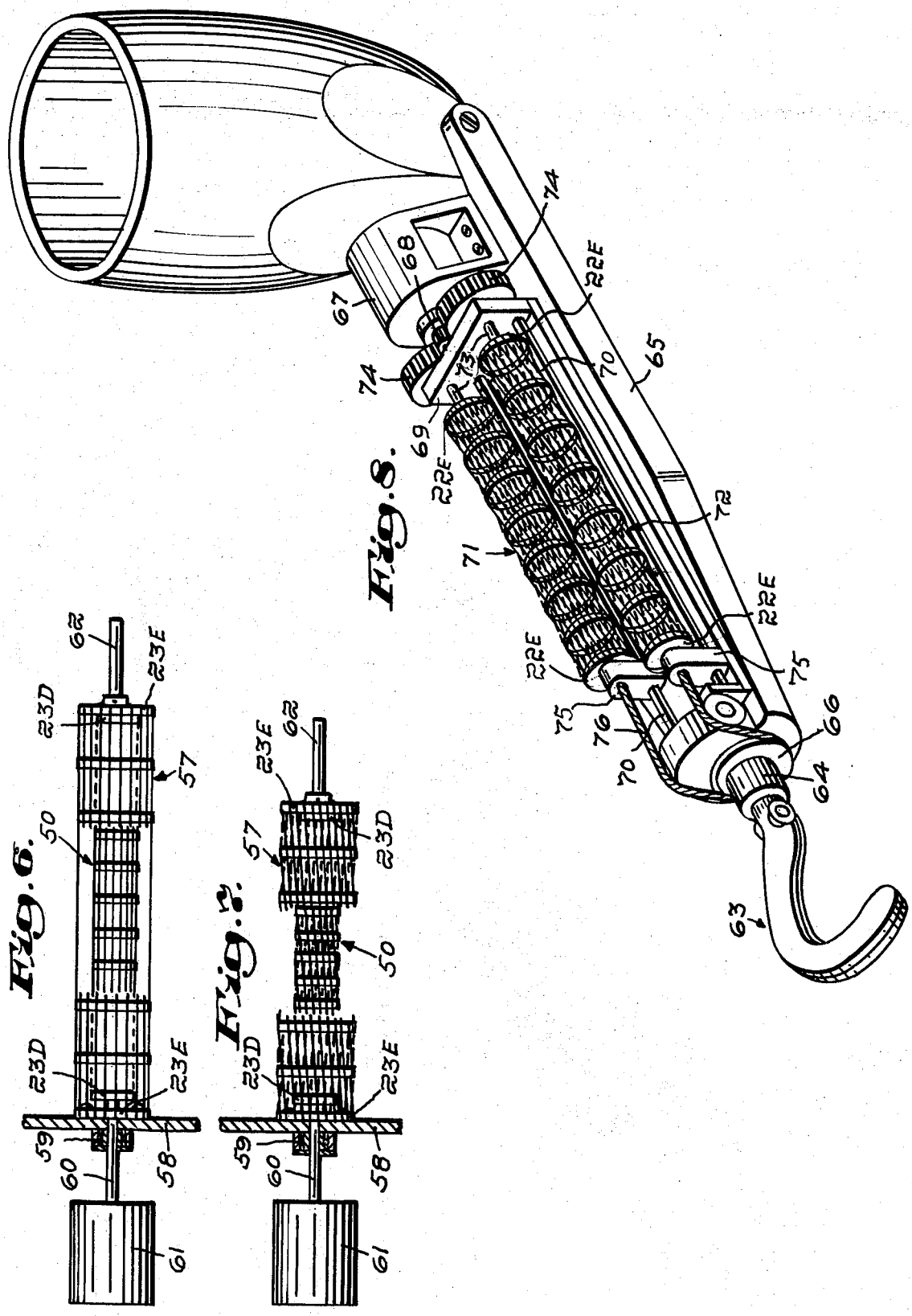

001
ROTARY-TO-LINEAR AND LINEAR-TO-ROTARY MOTION CONVERTERS

This is a continuation, of application Ser. No. 289,482, filed Sept. 15, 1972, now abandoned.

BACKGROUND OF THE INVENTION

There are, of course, many different types of mechanisms for converting rotary motion to linear motion or linear motion to rotary motion. As examples of such mechanisms, reference is made to racks and pinions, lead and ball screws, linkages, block and tackle equipment, winches, and various apparatus utilizing fluid pressure operated piston-cylinder combinations.

A disadvantageous feature of such mechanisms is the problem of friction, and hence they present such associated problems as the requirement for lubrication and attendant wear and noise.

There are, accordingly, many uses for rotary-to-linear or linear-to-rotary motion converters that operate with little friction, that also combine such other advantageous features as practically noiseless operation, light weight, low inertia, rugged but low cost construction, that do not require lubrication and operate without starting friction or dead zone and that at the same time provide a wide range of reductions.

Examples of such uses are as general servo-actuators, prosthetics and orthotics, manipulators, installations where weight reductions are important, servo-positioning systems, robots, and various low cost applications.

THE PRESENT INVENTION

The general objective of the present invention is to provide rotary-to-linear and linear-to-rotary motion converters that will meet the above requirements, an objective attained with converters each including at least one cell element consisting of two rotatable separators interconnected by at least two linking members at locations spaced equally from the axis of each separator thus to travel along circular paths as the separators turn. The linking members of each cell enable one separator to turn relative to the other and also to permit the axial extent of that cell to change on such relative movement.

Such cells are distinguished from the device shown in the patent to Brady, U.S. Pat. No. 2,564,669, by the distinguishing feature that the length of each linking member is less than the square root of the product of the diameter of the circular paths that the location of its connections with the separators describe as they turn thereby to prevent cell instability.

Converters in accordance with the invention usually consist of a series of cells with the separators of adjacent cells common thereto and the diameter of the path described by the locations of the separators of each cell may differ. The series of cells may be arranged in two sections, either concentric or parallel and, in the latter case, one set of corresponding ends is connected so that one rotates the other, the opposite end of said one section being connected to the operating means and the corresponding end of said other section being anchored.

In many cases, the converter is actuated by the operating means against a return, a spring for example and another objective of the invention is to utilize an antagonistic converter as a return.

In operation, a cell, when used as a rotary-to-linear motion converter contracts as one of its separators turns relative to the other thus providing the basis for linear movement. When a cell is used as a linear-to-rotary motion converter, the normal condition of a cell is contracted so that an endwise pull on one of its separators effects the turning of its other separator.

While an important feature of the invention is the provision of cells that have stability in use due to the relationship between the lengths of the linking members of each cell and the diameter of their circular paths when attached to the separators thereof, there are situations when stability is not always important. Accordingly, an objective of the invention is to provide cell combinations whether or not the cell structures provide stability in use.

BRIEF DESCRIPTION OF THE DRAWINGS

The accompanying drawings show illustrative embodiments of the invention of which

FIG. 5 is a somewhat schematic view of another assembly in accordance with the invention in which there are two series of cells, corresponding ends of which are gear-connected and attached to a slide and with the other end of one series rotated by a motor and the corresponding end of the other series fixed, illustrating structure equivalent to cascading elements as in a block and tackle;

FIG. 6 is another schematic view with two concentric series of cells, one connected to the actuating motor and the other connectable to a responding device;

FIG. 7 is a like view of the embodiment of FIG. 6 but with the converters contracted;

FIG. 8 is a view illustrating the use of parallel, oppositely driven converters actuated by a reversible motor and in control of a flexible actuator operable to turn a variable radius pulley;

FIG. 9 is a schematic view with the responding device a lever;

FIG. 10 is another like view of a device with the responding device a four bar linkage;

FIG. 11 is a schematic view of an embodiment of the invention in which converters are employed to actuate four bar linkage from within; and FIG. 12 is a fragmentary and partly sectioned view of a converter within a curved tube.

In FIGS. 1 and 2, a motion converter, generally indicated at 20 is shown as having a series of intermediate separators 21 and end separators 22 with a plurality of flexible linking members 23 extending from end-to-end of the converter and connected to each of the several separators 21, 22 to establish a series of cells C with each separator 21 common to two cells C. While the separators 21 are shown as rings and the end separators 22 as circular, the separators may be of other shapes and they may be made from any suitable material meeting weight and strength requirement. One end separator 22 is connected by a shaft 24 to a first device 25, the shaft free to turn in a fixed support D. The other end separator 22 is connected by a shaft 26 to a second device 27, the shaft 26 held against turning as by means of a pin P slideable in a slot S. Either device may be a driver and the other a follower.

Figure 3:
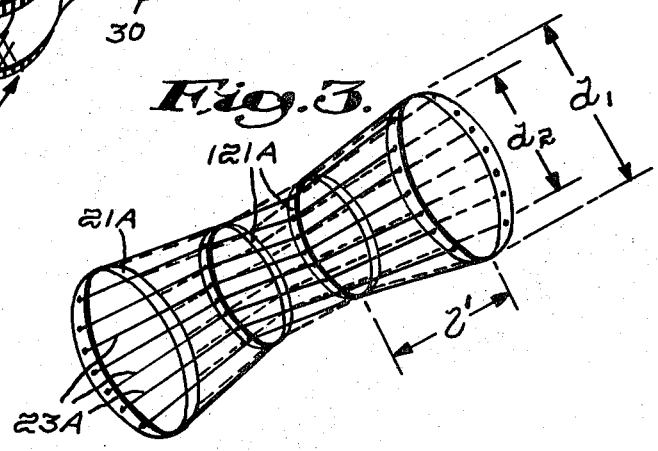
FIG. 3 is an elevational view of another series of cells in which the separators differ in diameter.

It will be assumed that all the separators are rotatable All the linking members are spaced equally from the axis of each separator so that as a separator is turned, the locations of the attachment of the linking members 23 thereto follow a circular pathway with reference to which they are spaced with approximate uniformity. It should be here noted that the length $l$ of each linking member 23 (with reference to each cell) is less than the square root of the product of the diameters $d_1$, $d_2$ of the circular pathways at the ends of that cell. Note also, see FIG. 3, that such circular pathways at the cell ends do not necessarily have the same diameter, as the separators 21A and 121A are not the same in that respect, provided that the cell length $l$ is less than the square root of the product of the diameters $d_1$ and $d_2$. This feature is shown in all other illustrated embodiments of the invention. While this feature is essential whenever cell stability is important or necessary, as it usually is, it may be omitted from certain of those embodiments when such stability is not a requirement.

The linking members 23 may consist of wire, wire rope, strands such as nylon and dacron or other suitable materials with tensile strength, compliance, flexibility and fatigue resistance being important considerations. Rigid links may also be used but such are not usually preferred because of the necessity and resulting cost of pivotally attaching them to the separators. In the usual case and as shown in all detailed showings of the converters, the linking members are flexible and there are a substantial number of them.

Figure 4:
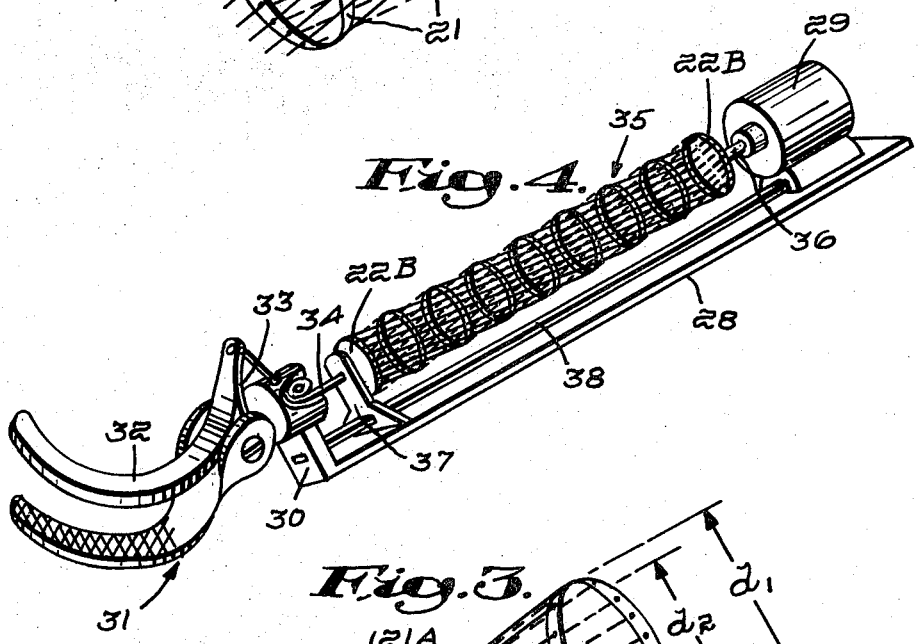
FIG. 4 is an elevational view of an assembly for operating a prosthetic hook.

In FIG. 4, an assembly for actuating a prosthetic hook is shown as illustrating an advantageous use of converters in accordance with the invention. The assembly is shown as having an elongated mount 28 attachable to the forearm structure and as having a motor 29 secured to one end thereof. The other end of the mount 28 has a shoulder 30 to which is attached a conventional prosthetic hook, generally indicated at 31 and having its movable jaw 32 yieldably held closed by a spring 33 and provided with a cord 34 so that the jaw 32 may be opened by a pull thereon.

A converter 35, which may be identical to the converter 20 has one of its end separators 22B axially connected to the shaft 36 of the motor 29 and the other of its end separators 22B provided with a fixed arm slidably held against rotation by the rectangular guide 38 fixed on the mount and extending lengthwise thereof. The cord 34 is attached thereto and to said other end separator.

With this construction, the operation of the motor 29 effects the application of torque to one end of the convertor 30. As the separator 22B to which the actuating cord 34 is attached, is held against turning, the turning of the other end separator 22B results in the contraction of the cells and a consequent jaw-opening pull on the cord 34 related to the extent to which the motor 29 is operated. When the motor is no longer energized, the spring 33 is operable to exert an axial pull on the converter, rotating its separators to restore the cells to their normal length.

It will be appreciated that for most purposes, a converter must consist of a series of cells, the number of cells in each series depending on the desired ratio reduction or the extent of the linear movement wanted. Where, as is usually the case, the cells are to be of relatively small cross sectional area, the number of cells in a series is substantial and for that reason, length problems are sometimes encountered when a particular linear movement or a particular ratio reduction is wanted.

In FIG. 5, the problem of converter length is met by providing an assembly in which the converter is divided into multiple cascaded parallel sections 40 and 41 with only two such sections shown to simplify the drawings. A support includes end walls 42 and 43 interconnected by a pair of rods 44 in slidable support of a slide 45 having an actuating stem 46 connectable to a servo device, not shown, that requires a pull to operate it.

The end wall 42 and the slide 45 have aligned bearings 47 and 48. The shaft 49 of a motor 50 is supported by the bearing 47 and is connected to one end separator 22C of the converter section 40 whose other end separator 22C has a stub shaft 51 supported by the bearing 48 and provided with a gear 52. One end separator 22C of the converter section 41 is fixed to the end wall 42 and the other of its end separators 22C has a stub shaft 53 provided with a gear 54 in mesh with the gear 52 and supported by a bearing unit 55 with which the slide 45 is provided.

With this arrangement, an adequate converter length is provided by the use of the two or more relatively short parallel sections 40 and 41 providing when the motor 50 is operating, an adequate linear travel of the stem 46.

Reference is now made to FIGS. 6 and 7 illustrating another embodiment of the invention where converter length problems are met. In this embodiment of the invention, the converter consists of two or more concentric sections 56 and 57. A support 58 has a thrust bearing 59 in support of the shaft 60 of the motor 61 which shaft is connected to the proximate end separator 23D of the inner converter 56 and its other end separator is fixed to an end separator 23E of the outer converter section 57 which is provided with an actuating stem 62. The other end separator 23E of the converter section 57 is fixed to the support 58. When the motor 61 is operated, the converter functions with the same effect as it would with the sections 56 and 57 axially connected but with approximately double the reduction and one-half the length.

It will be recalled that the converter 35 of FIG. 4 has a spring return and such a return may be variously incorporated in the other previously described embodiments of the invention. In FIG. 8 a different return is disclosed in connection with the wrist rotation of a prosthetic hook generally indicated at 63 having a rotatable connection 64 with the wrist end of the forearm structure 65 of an artificial arm. The connection 64 includes a pulley 66 and it will be noted that it has a varying radius for reasons presently explained.

A reversible motor 67 mounted on the other or elbow end of the forearm structure 65 has a gear 68 on its drive shaft. The forearm structure 65 is also provided with a support 69 adjacent the motor and a pair of lengthwise guides 70 connected thereto.

In this embodiment of the invention, there are two antagonistic converters, the converter 71 and the converter 72 and as these may be identical in construction to the converter 20 they are not otherwise detailed except to note that each has its rearmost end separator 22E provided with a shaft 73 rotatably secured in the supports 69 and having a gear 74 in mesh with the drive gear 68. The other or forward end separator 22E of each of the converters 71, 72 has a fixed arm 75 slidably held against turning by an appropriate one of the lengthwise rectangular guides 70 and an end of a cord 76 secured axially thereto and trained about the pulley 66.

In one extreme rotated position of the hook, one of the converters 71, 72 is fully contracted and the other converter relaxes, i.e., its linking members are substantially straight. When the motor 67 is energized to rotate the wrist pivot toward the other extreme position of the hook 63, the two converters are oppositely driven in order to relax the contracted converter and to contract the relaxed converter thereby to pull the cord 76 in the appropriate direction and thereby turn the pulley and the pivotal connection on which it is fixed. Because the axial movement of the two converters is not of the same except when they are both in about the same contracted condition, the variations in the pulley radius are required to linearize the output.

The above relationship of two converters is herein sometimes referred to as "antagonistic" and other examples of the use of antagonistic converters are schematically illustrated in FIGS. 9 and 10 and as the only indicated change in their structure is in the operated devices, only such devices will be discussed.

In FIG. 9, for example, the operated device is shown as a centrally pivoted bell crank lever 77 to opposite ends of which an appropriate one of the antagonistic connecting devices is connected as by separate flexible members 78. In FIG. 10 the device is a four bar linkage generally indicated at 79 with one side held at its ends by pivots 80 including pulleys 81 about appropriate ones of which the cord or cables 82 are trained with one cord 82 connected to one of the converters and to an opposite pivot 83 of the linkage. The other cord 82 similarly connects the other converter to the other pivot 83.

In FIG. 11, a four bar linkage 84 is shown with one side held at its ends by pivots 85 with the pivots 86 free. Diagonally opposite pivots are connected by converters 87 and 88 which are or may be identical to the converter 20 and have their motors indicated at 89 and 90, respectively.

Figure 1:
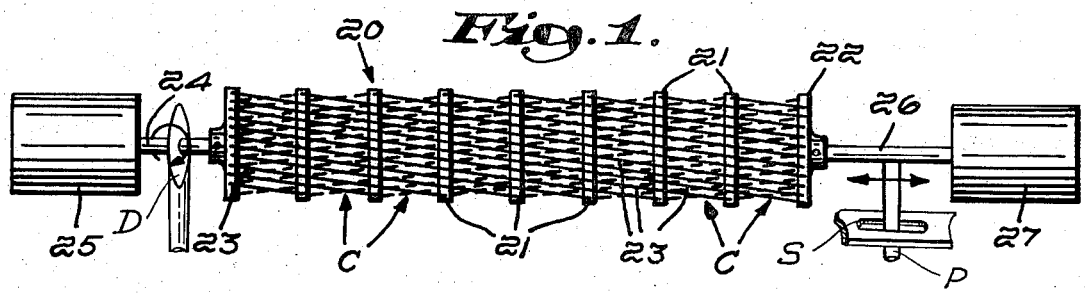
FIG. 1 is a somewhat schematic side elevation of an assembly consisting of a series of cells connected to two devices, either one of which may be rotatable and the other reciprocable and either one of which may be a driver and the other a follower.
Figure 2:
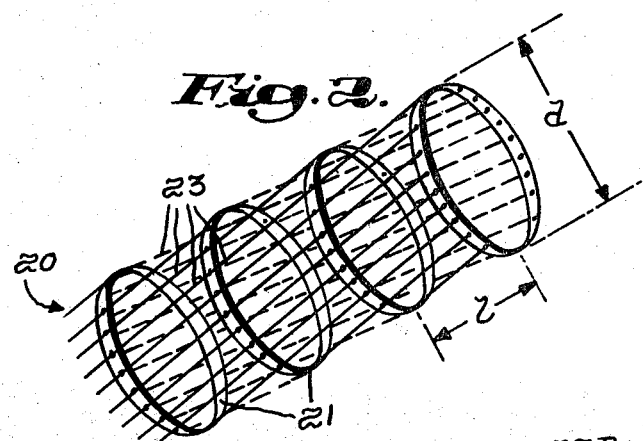
FIG. 2 is an enlarged isometric view of a part of the series of cell elements.

In FIG. 12, an embodiment of the invention is disclosed illustrating another of its features. When the connecting links of a converter are flexible, the axis of the operating and operated devices may be angularly disposed. To that end, a sheath 91 curved about and attached to a member 92, desirably internally lubricated, confines a portion of a converter 93 which again may be of the same construction as the converter detailed in connection with FIGS. 1 and 2 and operated in the same manner.

From the foregoing, it will be apparent that motion converters in accordance with the invention are well adapted for many different embodiments of which the foregoing are but illustrative.

I claim:

1. A rotary-to-linear or linear-to-rotary motion converter comprising at least one cell consisting of first and second separators, at least two linking members interconnecting the separators, first means connected to the first separator and operable to rotate it, and second means including a member connected to the second separator, said second means opposing rotation of the second separation by the first separator and the connecting member being movable towards the first separator when the first means is operated, said second means also operable to retract said connecting member and the second separator when the first means is inoperative, the first separator then rotating reversely, the linking members being connected to the separators at locations spaced equally from the axis of each separator thus to travel along a circular path if that separator turns, said locations being so spaced with respect to their respective paths that the axes of the separators remain in a substantially constant relationship as one separator turns in response to the turning of the other, said linking members being flexible, at least relative to said connections, and the length of the linking members being less than the square root of the product of the diameters of said paths to render said cell stable in use.

2. The motion converter of claim 1 in which the linking members are flexible.

3. The motion converter of claim 1 in which the locations at which the linking members are connected to the separators are such that the circular paths at both ends of the cell element are of the same diameter.

4. The motion converter of claim 1 in which the locations at which the linking members are connected to the separators are such that the circular path of the links at one end of the cell element has a diameter greater than the circular path at the other end of the cell element.

5. The motion converter of claim 1 and slidable means connected to said other separator prevents the rotation thereof.

6. The motion converter of claim 1 in which the second means is a spring.

7. The motion converter of claim 1 and a curved tube confining the converter but permitting the lengthwise travel of its separators.

8. A rotary-to-linear or linear-to-rotary motion converter comprising a plurality of cells, each cell consisting of two rotatable separators and at least two separator-connecting linking members connected to the separators at locations spaced equally from the axis of each separator thus to travel along a circular path as each separator turns, said locations being so spaced with respect to their respective paths that the axes of the separators remain in substantially constant relationship as one separator turns in response to the turning of the other said linking members being flexible, at least relative to said connections, said cells disposed in two parallel series, first means to rotate the separator at one end of one series, means to hold the corresponding end separator of the other series against turning, a connection between the separator at the other ends of the other, a slide to which said last named end separators are rotatably connected and which is movable towards the first named ends of the two series as the first means is operated, and second means connected to said slide and operable to retract it when the first means is inoperative, the separators then rotating reversely.

9. The motion converter of claim 8 in which the length of the linking members with respect to each cell element is less than the square root of the product of the diameters of the circular path at the ends thereof.

10. A rotary-to-linear or linear-to-rotary motion converter comprising a plurality of cells, each cell consisting of two rotatable separators and at least two separator-connecting linking members connected to the separators at locations spaced equally from the axis of each separator thus to travel along a circular path as each separator turns, said locations being so spaced with respect to their respective paths that the axes of the separators remain in substantially constant relationship as one separator turns in response to the turning of the other said linking members being yieldable, at least relative to said connections, the cells arranged in first and second series with the cells of each series interconnected, the separators of at least the first series that are between the ends thereof all having a central opening, the series of cell elements of the second series being dimensioned for free entry through said central openings and being within and extending from end-to-end of said first series, the separators at one end of both series being interconnected to rotate together, rotatable driving means connected to the other end separator of one series, means holding the corresponding end separator of the other series against turning, and a device including a member to which the interconnected separators are connected and movable towards the second named end separators when the driving means is operated, said devices being operable to pull the interconnected end separators away from the second named end separators when the driving means is not in operation.

11. The motion converting device of claim 10 in which the length of each linking member with respect to each cell is less than the square root of the product of the diameters of said paths and renders said cell stable in use.

12. The motion converting device of claim 10 in which the pivoted device includes pulley means providing radial variations compensating for the differential travel between an extending converter and a contracting converter.

13. The motion converting device of claim 12 in which the pulley means is a single pulley and the connection is a flexible element trained about the pulley and connected to both converters.

14. The motion converting device of claim 12 in which the pivoted device is a four-bar linkage including two supporting pivots and the pulley means includes a pulley coaxial with each supporting pivot and the connection includes two flexible elements one for each converter and in trained engagement with an appropriate one of the pulleys and connected to the opposite one of the other pivots of the linkage.

15. The motion converting device of claim 10 in which the pivoted device is a centrally pivoted bell crank lever and the connection includes sections connected to the ends thereof.

16. A rotary-to-linear or linear-to-rotary motion converting device, said device including two converters each comprising at least one cell, each cell consisting of two rotatable separators and at least two linking members connected to the separators at locations spaced equally from the axis of each separator thus to travel along a circular path if that separator turns, said locations being so spaced with respect to their respective paths that the axes of the separators remain in a substantially constant relationship as one separator turns in response to the turning of the other, said linking members being flexible, at least relative to said connections, a reversible drive connected to corresponding end separators of both converters, and the other end separators of the two converters being free to move towards and away from said drive, a pivoted device having first and second positions, and a connection between said device and said other end separators operable to pull either one away from the drive as the other is pulled towards it and pivot said device towards the appropriate one of said positions.

17. A positioning device comprising a four-bar linkage, the pivots at both ends of one bar being supporting pivots, two rotary-to-linear or linear-to-rotary motion converters, each comprising at least one cell, each cell consisting of two rotatable separators and at least two separator-connecting linking members connected to the separators at locations spaced equally from the axis of each separator thus to travel along a circular path if that separator turns, said locations being so spaced with respect to their respective paths that the axes of the separators remain in a substantially constant relationship as one separator turns in response to the turning of the other, said linking members being flexible, at least relative to said connections, each converter including a drive connected to one of its separators and means connecting the other of its separators to the opposite pivot of said linkage, the operation of either drive shifting the linkage in a direction opposite to that effected by the other drive and, when operated, exerting a pull on said other separator of the other converter.

* * * * *